United States Patent [19]

Matsui et al.

[11] Patent Number: 4,808,903
[45] Date of Patent: Feb. 28, 1989

[54] VECTOR CONTROL SYSTEM FOR INDUCTION MOTORS

[75] Inventors: Takayuki Matsui, Hitachi; Toshiaki Okuyama; Takashi Sukegawa, both of Ibaraki; Junichi Takahashi, Katsuta, all of Japan

[73] Assignee: Hitachi, Ltd., Tokyo, Japan

[21] Appl. No.: 181,313

[22] Filed: Apr. 13, 1988

[30] Foreign Application Priority Data

Apr. 13, 1987 [JP] Japan .................. 62-88828

[51] Int. Cl.[4] ............................................. H02P 5/40
[52] U.S. Cl. ...................... 318/800; 318/808
[58] Field of Search ............... 318/800, 801, 802, 803, 318/807–811

[56] References Cited

U.S. PATENT DOCUMENTS

| 4,593,240 | 6/1986 | Blaschke | 318/800 |
| 4,628,475 | 12/1986 | Azusawa et al. | 318/802 |
| 4,680,526 | 7/1987 | Okuyama et al. | 318/808 |

Primary Examiner—David Smith, Jr.
Attorney, Agent, or Firm—Antonelli, Terry & Wands

[57] ABSTRACT

A vector control system for an induction motor driven by a power converter which generates three phase ac currents containing harmonics. In the system, an exciting current command value and a torque current command value in a rotating magnetic field coordinate system are applied, induction motor primary currents in a stator coordinate system is detected at a period which is the same or integral multiple of that of the harmonic components by integration operation, the detected value of the integrated primary currents is subjected to definite integration over the same time interval as the period thereof thereby detecting fundamental wave components of the primary currents without the harmonic components, the fundamental wave components are transformed in the form of rotating magnetic field coordinate system thereby detecting an exciting current component and a torque current component, a deviation between the exciting current command value and the detected actual exciting current component and a deviation between the torque current command value and the detected actual torque current component are detected respectively, and producing and applying to the power converter three phase ac voltage command values in the stator coordinate system tending to reduce the deviations to zero.

62 Claims, 11 Drawing Sheets

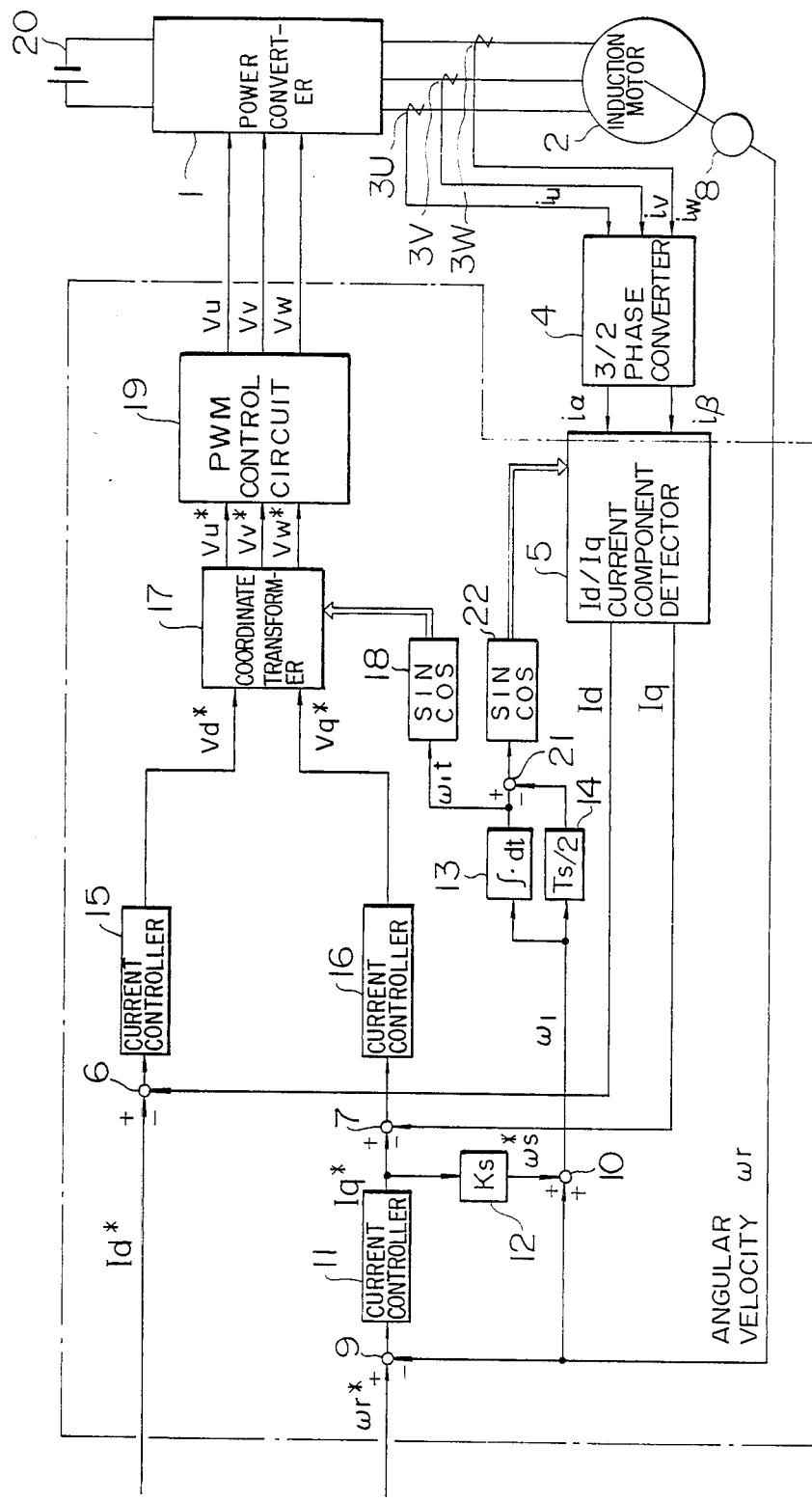

VECTOR CONTROL SYSTEM FOR INDUCTION MOTORS

FIELD OF THE INVENTION

The present invention relates to a vector control system for ac induction motors and more particularly to a control system well suited for the vector control of an ac induction motor of the type driven by primary currents containing harmonic components and a method and apparatus for detecting an exciting current component and torque current component in the vector control system.

BACKGROUND OF THE INVENTION

As a system for effecting the vector control of an ac induction motor with a high degree of accuracy, there has been known a system including a closed loop so that the exciting current component and torque current component in a rotating magnetic field coordinate system of a motor are detected and the detected values are fed back to a primary voltage command generating unit, thereby controlling the primary voltage value to reduce the deviations between these detected values and an exciting current command value and torque current command value, respectively, to zero. In the motor of the type driven by a power converter, e.g., an inverter, the primary current contains much harmonic components. With the conventional vector control system, the detection of the primary current of a motor is effected in such a manner that in order to avoid any fundamental harmonic current detection error due to the harmonic components, the primary current value is sampled by a high-speed A/D converter having a sampling frequency (e.g., a sampling period of 1 to 10 μsec) which is about 10 times the harmonic frequency and an exciting current component $i_d$ and a torque current component $i_q$ are calculated from the sampled value. Therefore, it is necessary that the processor used for signal processing purposes must also be of a high-speed type having a processing speed which is about the same as the sampling period of the A/D converter. This is a cause of preventing all the circuits of the control system from being processed digitally by the microprocessor.

An example of a vector control system for an induction motor driven by a VVVF inverter is disclosed in JP-B-No. 60-19236 filed in Japan by Toyo Denki Seizo Kabushiki Kaisha on Apr. 15, 1980. With this system, in order to eliminate the harmonic components, the sampling frequency of the primary current must be set greater than two times the harmonic frequency and a high-speed A/D converter and processor are required.

SUMMARY OF THE INVENTION

It is an object of the present invention to provide a vector control method and system which require the use of no high-speed A/D converter and which utilize a low-speed processor to enable the vector control by a low-speed processing employing a sampling period which is the same or integral multiple (about 1 to 5 times) of the period of a PWM carrier as well as a current detecting method and system.

To accomplish the above object, the construction of the invention has a feature that the primary currents of an induction motor are detected and transformed to a rotating magnetic field coordinate system. In accordance with an embodiment of the invention, the three phase primary currents of an induction motor are detected so that the detected three phase currents are converted to two phase currents and the converted respective phase currents are integrated and then sampled at the intervals of the same period as that of the harmonic components (or an integral multiple of the harmonic period). As the result of this integration processing, the harmonic components are removed from the detected primary current values as will be explained later by the use of expressions. Thus, the integration results represent the ones obtained by integrating the fundamental harmonics of the primary currents. Then, the difference between the integrated value of the nth (n is an integral value) sampled value and the integrated value of the (n+1)th sampled value is determined, thereby obtaining an instantaneous value of the fundamental harmonic of each primary current. These instantaneous values are vector values in the stator coordinate system and therefore they are transformed to vector values in the rotating magnetic field coordinate system by a coordinate transformer, thereby detecting vector components, i.e., an exciting current component and torque current component. The exciting current component and the torque current component are the current components without the harmonic components so that by comparing these values with an exciting current command value and a torque current command value, respectively, and controlling the primary voltage in such direction tending to reduce the resulting differences to zero, it is possible to effect the vector control with greater accuracy. Also, since the period of the detection sampling of the integrated primary current can be selected to be the same with the period of the harmonic components or its integral multiple, it is suffice to use a low-speed processor of 0.5 to 3 msec (e.g., the Type 8095 16-bit microprocessor manufactured by the Intell Corp.). It is to be noted that in accordance with another embodiment of the invention, the integration processing can be effected directly from the two phase currents of the three phases without performing the 3-phase-to-2-phase conversion.

BRIEF DESCRIPTION OF THE DRAWINGS

FIG. 1 is a block diagram showing the overall construction of a vector control system according to the invention;

DESCRIPTION OF THE PREFERRED EMBODIMENTS

Figure 2A:
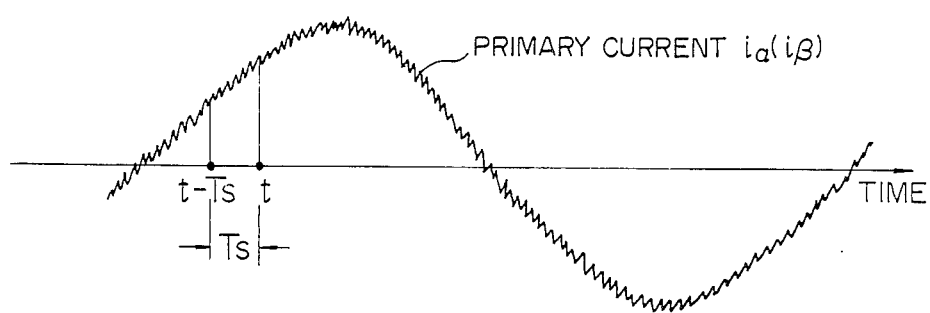
FIGS. 2A to 2C are diagrams for explaining the principle of removing the harmonic components according to the invention.

To explain the present invention, the overall construction of a vector control system will be described first and then the principle of a primary current detecting method constituting a point of the invention will be explained by using expressions.

FIG. 1 is an overall block diagram of an induction motor vector control system to which the invention is applied. A three-phase induction motor 2 is driven by a power converter 1 such as an inverter. The power converter 1 is supplied with power from a dc power source 20. The three-phase output from the power converter 1 becomes the primary voltages of the induction motor 2. The values of the primary currents in the respective phases are detected as $i_u$, $i_v$ and $i_w$ by current detectors 3U, 3V and 3W, respectively. These three phase ac primary currents are converted to two phase ac currents $i_\alpha$ and $i_\beta$ by a 3/2 phase converter 4. The time integral of the two phase ac currents $i_\alpha$ and $i_\beta$ in a stator coordinate system are respectively made to produce $I_\alpha$ and $I_\beta$. $I_\alpha$ and $I_\beta$ are converted to an exciting current component $I_d$ and a torque current component $I_q$ in a rotating magnetic field coordinate system by an exciting current-torque current component detector 5. The exciting current component $I_d$ is applied in negative polarity to an adder 6 where it is added to an exciting current command value $I_d^*$. The torque current component $I_q$ is applied in negative polarity to an adder 7 where it is added to a torque current command value $I_q^*$. On the other hand, the rotational speed (angular frequency) $\omega_r$ of the induction motor 2 is detected by a speed detector 8 and then applied in negative polarity to an adder 9 where it is added with a speed command value $\omega_r^*$. Simultaneously, the rotational speed $\omega_r$ is applied to an adder 10. The output from the adder 9 represents the deviation between the actual speed and the speed command value. The speed deviation value is received by a speed controller 11 which in turn generates a torque current command value $I_q^*$ in a direction tending to reduce the deviation to zero. The torque current command value $I_q^*$ is applied to a slip calculator 12 and the adder 7. The slip calculator 12 calculates the motor slip frequency $\omega_s^*$ and applies it to the adder 10. The adder 10 performs the addition of $\omega_s^*$ and $\omega_r$ and outputs the resulting sum as a primary angular frequency $\omega_1$ of the induction motor. The primary angular frequency $\omega_1$ is applied to an integrator 13 and a proportional gain amplifier 14. The adder 6 generates the deviation between the exciting current command value $I_d^*$ and the detected exciting current value $I_d$ and applies it to an automatic current controller 15. By the PI (Proportional/Integral) control, for example, the current controller 15 produces and outputs a voltage component command $v_d^*$ in the rotating magnetic field coordinate system in a direction tending to reduce the exciting current deviation to zero. The adder 7 generates the deviation between the torque current command value $I_q^*$ and the detected torque current value $I_q$ and applies it to the other current controller 16. By the PI control, for example, the current controller 16 produces and outputs a voltage component command $v_q^*$ in the rotating magnetic field coordinate system in a direction tending to reduce the torque current deviation to zero. The two voltage command values $v_d^*$ and $v_q^*$ are applied to a coordinate transformer 17 in which these input values are changed to three phase voltage command values $v_u^*$, $v_v^*$ and $v_w^*$ in a stator coordinate system from the rotating magnetic field coordinate system. Coordinate reference signals for the coordinate transformer 17 are supplied by an oscillator 18 which generates a sine wave and a cosine wave in response to the output from the integrator 13. The outputs of the coordinate transformer 17 are applied to a pulse width modulation control circuit 19 so that outputs $v_u$, $v_v$ and $v_w$ produced as the result of PWM modulation of a given carrier frequency by a voltage command are applied to the power converter 1, thereby determining voltages and a frequency for the induction motor 2. On the other hand, the current component detector 5 converts the primary current values in the stator coordinate system to the current values in the rotating magnetic field coordinate system and the coordinate reference signals for this coordinate transformation are the sine wave and cosine wave generated from an oscillator 22 in accordance with the output of an adder 21 or the difference between the outputs of the integrator 13 and the proportional gain amplifier 14.

Referring now to the following expressions, a description will be made of the reasons that when the primary current value is integrated and sampled at the harmonic period (or its integral multiple), the harmonic components of the primary current are removed so that the difference between the integrated value of the nth sampled value of the primary current and the integrated value of the (n+1)th sampled value represents the instantaneous value of the fundamental wave of the primary current.

Referring to FIG. 2A, there is illustrated the waveform of the primary current ($i_\alpha$ or $i_\beta$) containing the harmonic component. Symbol $T_S$ represents the sampling period of the integrated primary current.

Now, the integrated value $I_n$ of the primary current at the nth sampling time $(t-T_s)$ is given as follows $$I_n = \int_0^{t-T_s} i_\alpha \, dt \tag{1}$$

Also, the integrated value $I_{(n+1)}$ of the primary current at the next (n+1)th sampling time t is expressed as follows $$I_{(n+1)} = \int_0^t i_\alpha \, dt \tag{2}$$

Figure 2B:
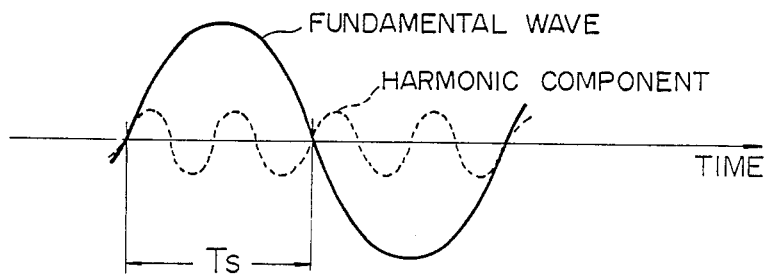

Therefore, since the difference between the two integrated values is the definite integral of the primary current during the interval $(t-T_S)$ to t, we obtain $$I_{(n+1)} - I_n = \int_{t-T_S}^t i_\alpha \, dt \tag{3}$$

$$= \int_{t-T_S}^t (I_\alpha + i_{\alpha h}) \, dt \tag{4}$$

$$= \int_{t-T_S}^t I_\alpha \, dt + \int_{t-T_S}^t i_{\alpha h} \, dt \tag{5}$$

where $I_\alpha$ = fundamental wave component
$i_{\alpha h}$ = harmonic component Here, the harmonic component contained in the output ac current of the PWM inverter is in synchronism with the period of the carrier wave as shown in FIG. 2B, if the integration interval of $(t-T_S)$ to $t$ or the sampling period $T_S$ is selected to be the same as the period of the harmonic component or its integral multiple (e.g., about 1 to 5 times), the integrated value of the harmonic component becomes zero since the integration of one period of a sinusoidal wave is zero. In other words, the integration term of the harmonic component in the right member of equation (5) becomes zero.

Therefore, the difference between the two integrated values becomes the definite integrated value of the fundamental wave for the integration interval $T_S$.

$$I_{(n+1)} - I_n = \int_{t-T_S}^{t} I_\alpha \, dt \tag{6}$$

Figure 2C:
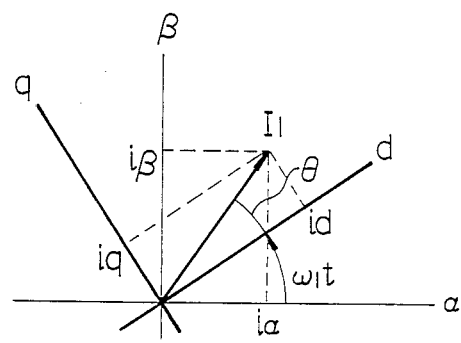

Now, the fundamental harmonic component $I_\alpha$ of the primary current is given from the vector coordinate diagram of FIG. 2C, as follows $$I_\alpha = I_1 \cdot \cos(\omega_1 t + \theta) \tag{7}$$

Here
$I_1$ = magnitude $$\sqrt{i_\alpha^2 + i_\beta^2}$$

of vector of primary current
$\omega_1$ = primary angular frequency
$T_S$ = sampling period
$\theta$ = phase angle of space vector Therefore, assuming that the difference $I_{(n+1)} - I_n$ is represented as $\Delta I_\alpha$, then equation (6) becomes as follows $$\begin{aligned}\Delta I_\alpha &= \int_{t-T_S}^{t} I_1 \cdot \cos(\omega_1 t + \theta) \cdot dt \\ &= \frac{2}{\omega_1} \cdot \sin\frac{\omega_1 T_S}{2} \cdot I_1 \cdot \cos\left(\omega_1 t + \theta - \frac{\omega_1 T_S}{2}\right)\end{aligned} \tag{8}$$

Also, the following holds with respect to the fundamental wave component $i_\beta$ $$\begin{aligned}\Delta I_\beta &= \int_{t-T_S}^{t} I_1 \cdot \sin(\omega_1 t + \theta) \cdot dt \\ &= \frac{2}{\omega_1} \cdot \sin\frac{\omega_1 T_S}{2} \cdot I_1 \cdot \sin\left(\omega_1 t + \theta - \frac{\omega_1 T_S}{2}\right)\end{aligned} \tag{9}$$

In this case, the $2/\omega_1 \cdot \sin \omega_1 T_S/2$ for the definite integrated values $I_\alpha$ and $I_\beta$ is a constant term which is independent of time and thus it will be seen that if a proper gain compensation is provided so that the constant term becomes 1, it is possible to obtain fundamental wave components $I_1 \cos(\omega_1 t + \theta)$ and $I_1 \sin(\omega_1 t + \theta)$. It is to be noted that the term $-\omega_1 T_S/2$ is an error due to the integration and thus this error must be compensated for in order to obtain an accurate fundamental wave. As will be explained later, this phase error compensation is effected by correcting the coordinate references during the transformation of the primary current from the stator coordinate system to the rotating magnetic field coordinate system.

As described hereinabove by means of equation (1) to (8), it will be seen that when obtaining the integrated value of the primary current value, by selecting the sampling period $T_S$ to be the same as the period of the harmonic components in the PWM modulated wave or its integral multiple (preferably 1 to 5) and definite integration of the primary currents for the sampling interval $T_S$ is operated, it is possible to obtain the fundamental wave of the primary current without the harmonic components. In addition, the primary current can be detected with a sampling period which is an integral multiple of the harmonic period or a considerably long period (low frequency) as compared with the sampling period of the convensional A/D converter. Thus, it is possible to construct the whole control circuitry with a low-speed microprocessor and perform all the operations digitally as mentioned previously.

Next, the details and operation of the detector 5 for an exciting current and a torque current in a rotating magnetic field coordinate system in an embodiment of the invention utilizing the above-mentioned principle, will be described with reference to FIG. 3. The detector 5 of the highest accuracy construction is mainly composed of an integrator 23 for integrating the outputs of the 3 phase-2 phase converter 4 or the two phase ac currents $i_\alpha$ and $i_\beta$, differential circuits 24 and 25 for respectively calculating definite integrated values from the respective integrator outputs at intervals of the current detection sampling period $T_S$, a coordinate transformation circuit 26 for transforming each of the definite integrated values in the stator coordinate system to a rectangular coordinate system (rotating magnetic field coordinate system) which is delayed by a phase angle proportional to the product of the primary angular frequency $\omega_1$ and the sampling period $T_S$ with respect to the stator coordinate system, and a gain compensation circuit 27 for correcting the amplitude of the outputs from the coordinate transformation circuit 27 in accordance with the magnitudes of the primary angular frequency $\omega_1$ and the period $T_S$. In the integrator 23, the outputs of the 3 phase-2 phase converter 4 or the analog quantity of each of the two phase ac currents is converted to a number of pulses proportional to the magnitude of the ac current by a voltage-frequency converter 28 or 29 and the numbers of pulses are counted up or down by reversible counters 30 and 31, respectively, in accordance with the polarity of the two phase ac currents, thereby holding the resulting counts in latch circuits 32 and 33, respectively, at the given period $T_S$.

The differential circuits 24 and 25 respectively subject the latched integrated values to definite integration for the integration interval $T_S$. In the differential circuit 24 (25), a $z^{-1}$ 34 (35) is a kind of memory for storing the value in the latch circuit 32 (33) at the time $(t-T_S)$ or the integrated value obtained $T_S$ period before and its output is applied in negative polarity to an adder 36 (37). When the value in the latch circuit 32 (33) at the time $t$ is applied to the other input of the adder 36 (37), the value at the time $(t-T_S)$ is subtracted from this value. Thus, the differential circuit 24 (25) performs the calculations of equations (7) or (8). The coordinate transformation circuit 26 is responsive to reference signals or the output signals of a cosine function oscillator 44 and a sine function oscillator 45 forming the oscillator 22 to perform a coordinate transformation operation on the outputs (in a stator coordinate system) of the differential circuits 24 and 25 through multipliers 38, 39, 40 and 41 and adders 42 and 43 to change them to a rotating magnetic field coordinate system and generate as its outputs. The outputs of the coordinate transformation circuit 26 are respectively applied to proportional gain circuits 46 and 47 of a magnitude $1/T_S$ period and multipliers 49 and 50. A multiplier 48 obtains a square of the primary angular frequency $\omega_1$ and applies it to the multipliers 49 and 50, respectively. The outputs of the multipliers 49 and 50 are respectively applied to proportional gain circuits 51 and 52 so that they are respectively combined with the outputs of the proportional gain circuits 46 and 47 and an exciting current $I_d$ and a torque current $I_q$ in the rotating magnetic field coordinate system are respectively generated from adders 53 and 54.

The operation of the coordinate transformation circuit 26 and the gain compensation circuit 27 will now be described with reference to the following expressions. The coordinate transformation means the transformation of the vector $I_1$ in FIG. 2C to the respective components in the rotating magnetic field coordinate system d-q from the stator coordinate system $\alpha$-$\beta$. The relation between the values $\Delta I_\alpha$ and $\Delta I_\beta$ of the primary current fundamental harmonic components in the stator coordinate system which are produced by the differential circuits 24 and 25 and the exciting current component $I_d$ and the torque current component $I_q$ in the rotating magnetic field coordinate system which are produced by the gain compensation circuit 27 is as follows.

$$\begin{bmatrix} I_d \\ I_q \end{bmatrix} = \left( \frac{2}{\omega_1} \cdot \sin \frac{\omega_1 T_S}{2} \right)^{-1} \begin{bmatrix} \cos\left(\omega_1 t - \frac{\omega_1 T_S}{2}\right) & \sin\left(\omega_1 t - \frac{\omega_1 T_S}{2}\right) \\ -\sin\left(\omega_1 t - \frac{\omega_1 T_S}{2}\right) & \cos\left(\omega_1 t - \frac{\omega_1 T_S}{2}\right) \end{bmatrix} \begin{bmatrix} \Delta I_\alpha \\ \Delta I_\beta \end{bmatrix} \quad (11)$$

$$\left( \frac{2}{\omega_1} \cdot \sin \frac{\omega_1 T_S}{2} \right)^{-1} \approx \frac{1}{T_S} + \frac{\omega_1^2 \cdot T_S}{24}$$

Here, the term $$\left( \frac{2}{\omega_1} \cdot \sin \frac{\omega_1 T_S}{2} \right)^{-1}$$

in the right member of equation (10) is the gain correction factor necessary for selecting the previously mentioned constant term to be 1. The approximation of the expression (11) can be used for this term and therefore the gain compensation circuit 27 of FIG. 3 is constructed so as to perform the approximate expression (11). Also, the term $-\omega_1 T_S/2$ is the one for compensating the previously mentioned phase error due to the integration. In other words, the primary current vector determined by integration operation is delayed by $\omega_1 T_S/2$ in the phase as compared with the actual current vector. Accordingly, the rotating magnetic field coordinate for the detected current vector is compensated to be rotated by $-\omega_1 T_S/2$ from the actual rotating magnetic field coordinate q-d shown in FIG. 2C thereby to obtain a correct primary current vector components. This phase error compensation is effected by correcting the phases of the coordinate reference signal oscillators 44 and 45 by the lag compensating circuits 13 and 14 of FIG. 3.

By substituting equations (8) and (9) for the $\Delta I_\alpha$ and $\Delta I_\beta$ in equation (10) for rearrangement, the following equation holds for the $I_d$ and $I_q$.

$$\begin{bmatrix} I_d \\ I_q \end{bmatrix} = I_1 \begin{bmatrix} \cos \theta \\ \sin \theta \end{bmatrix} \quad (12)$$

The right member of equation (12) represents the exciting current and torque current components themselves in the rotating magnetic field coordinate system provided by the actual fundamental harmonic current and it shows that they can be detected with a high degree of accuracy.

The above-described operation shows the case where the period $T_S$ is made coincident with the period of the harmonic components and now a description will be made of a case where these periods are not coincident with reference to the following equations. In the noncoincident case, there are some harmonic components left and their magnitudes are given in terms of definite integrated values $\Delta I_{\alpha n}$ and $\Delta I_{\beta n}$ of two phase ac current harmonic components $i_{\alpha n}$ and $i_{\beta n}$ in the stator coordinate system as the following equations $$\Delta I_{\alpha n} = \int_{t-T_S}^{t} I_n \cdot \cos(\omega_n t) \cdot dt \quad (13)$$

$$= \frac{2}{\omega_n} \cdot \sin \frac{\omega_n \cdot T_S}{2} \cdot \cos\left(\omega_n t + \frac{\omega_n T_S}{2}\right)$$

$$\Delta I_{\beta n} = \int_{t-T_S}^{t} I_n \cdot \sin(\omega_n t) \cdot dt \quad (14)$$

$$= \frac{2}{\omega_1} \cdot \sin \frac{\omega_n T_S}{2} \cdot \sin\left(\omega_n t - \frac{\omega_n T_S}{2}\right)$$

Here, $I_n = \sqrt{i_{\alpha n}^2 + i_{\beta n}^2}$ $\omega_n$ = angular frequency (rad/s) of harmonic components Therefore, the harmonic components $i_{dn}$ and $i_{qn}$ appearing in the rotating magnetic field coordinate system are given by the following equation from equations (10), (13) and (14)

$$\begin{bmatrix} i_{dn} \\ i_{qn} \end{bmatrix} = \frac{\omega_1}{\omega_n} \cdot \quad (15)$$

-continued $$\frac{\sin\frac{\omega_n T_S}{2}}{\sin\frac{\omega_1 T_S}{2}} \cdot I_n \begin{bmatrix} \cos\left[(\omega_n - \omega_1)t - \frac{\omega_n - \omega_1}{2} \cdot T_S\right] \\ \sin\left[(\omega_n - \omega_1)t - \frac{\omega_n - \omega_1}{2} \cdot T_S\right] \end{bmatrix}$$

Thus, the transfer function characteristic $|G|$ of the current component detector 5 with respect to the harmonic components is given by the following equation.

$$|G| = 20 \cdot \log \left| \frac{\omega_1}{\omega_n} \cdot \frac{\sin\frac{\omega_n T_S}{2}}{\sin\frac{\omega_1 T_S}{2}} \right| \tag{16}$$

Figure 4A:
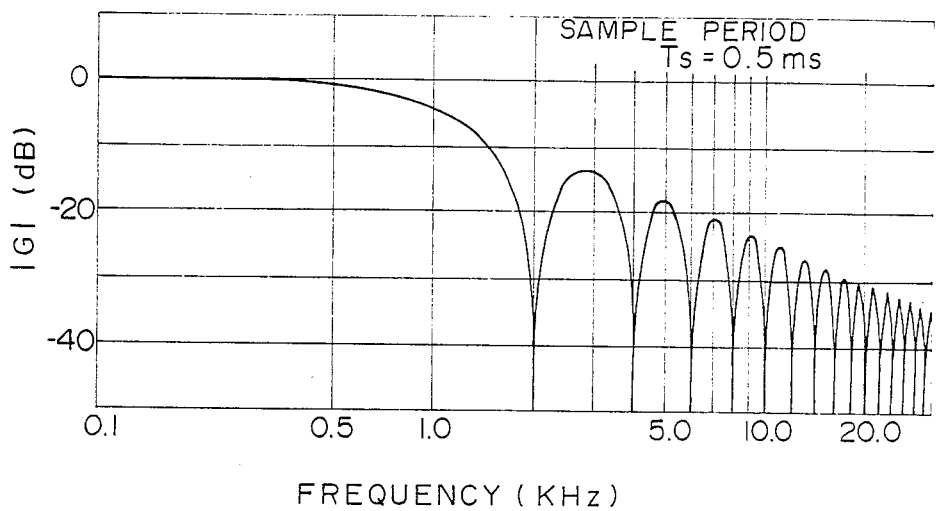
FIGS. 4A to 4C are characteristic diagrams for explaining the attenuation of the harmonic components according to the invention.
Figure 4B:
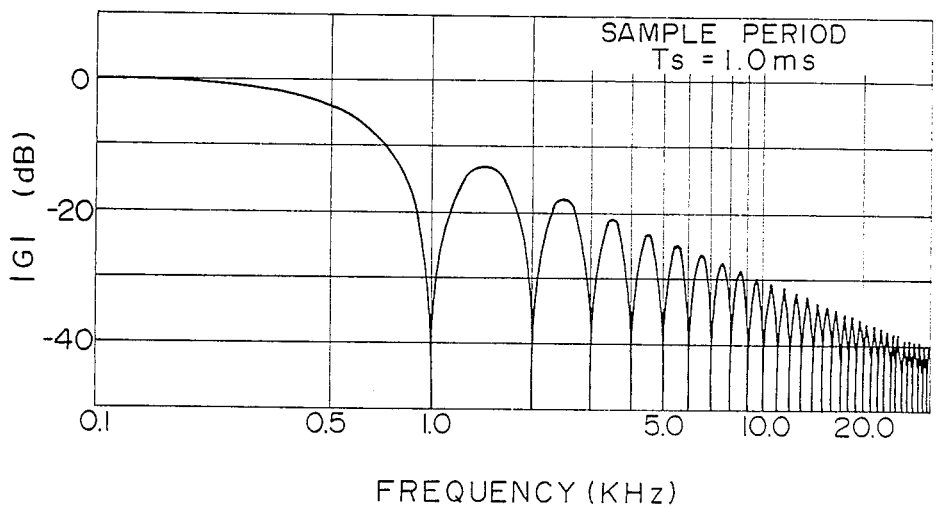
Figure 4C:
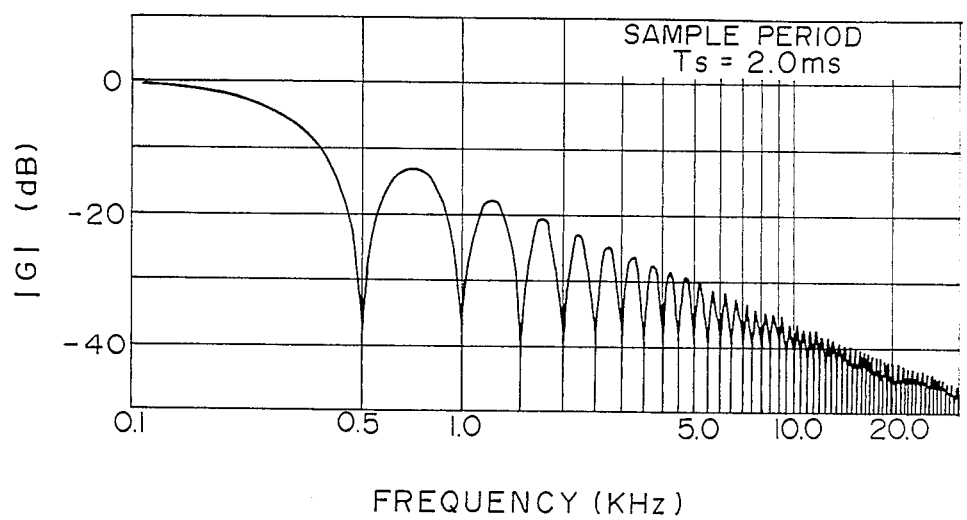

FIGS. 4A to 4C show the transfer function characteristics obtained from equation (16) by using three different sampling periods. It will be seen from these characteristics that the harmonic components which are integral multiples of $1/T_S$ are attenuated most satisfactorily and generally these characteristics are close to that of a first order lag filter. In addition, the detection gain with respect to the fundamental harmonic component $\omega_1$ is 0 (dB), showing that the detection can be effected with a very high degree of accuracy.

As will be seen from the above-described operation, by selecting the period $T_S$ to be integral multiple (preferably about 1 to 5 times) of the period of the principal harmonic component of the power converter, it is possible to select the sampling period longer than that of the conventional system and remove the harmonic components fully, thereby effecting the detection of the exciting current and the torque current in the rotating magnetic field coordinate system which are provided by the fundamental wave component with a high degree of accuracy.

Figure 3:
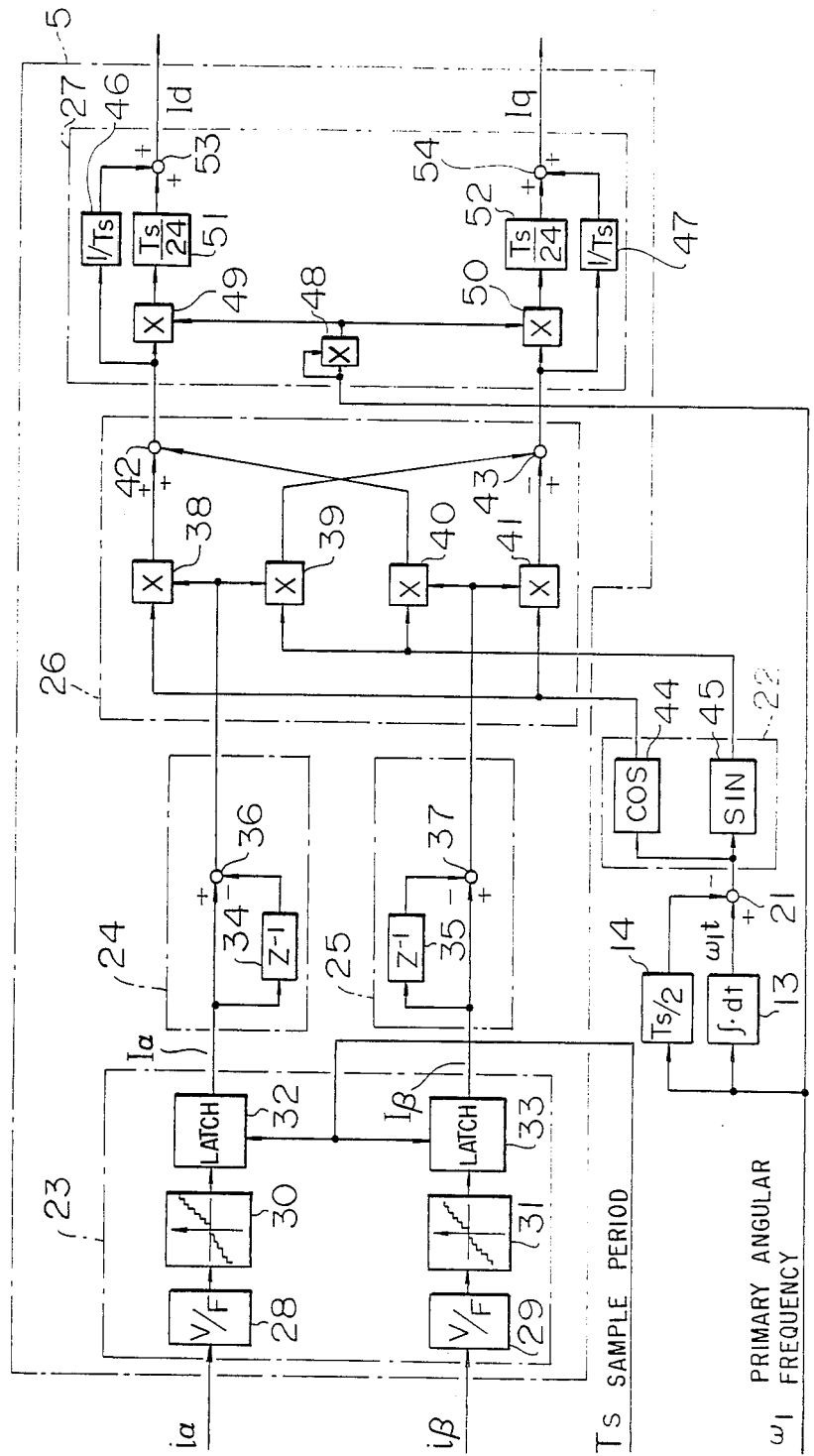
FIG. 3 is a circuit diagram showing the details of a first embodiment of the current component detector according to the invention.
Figure 5:
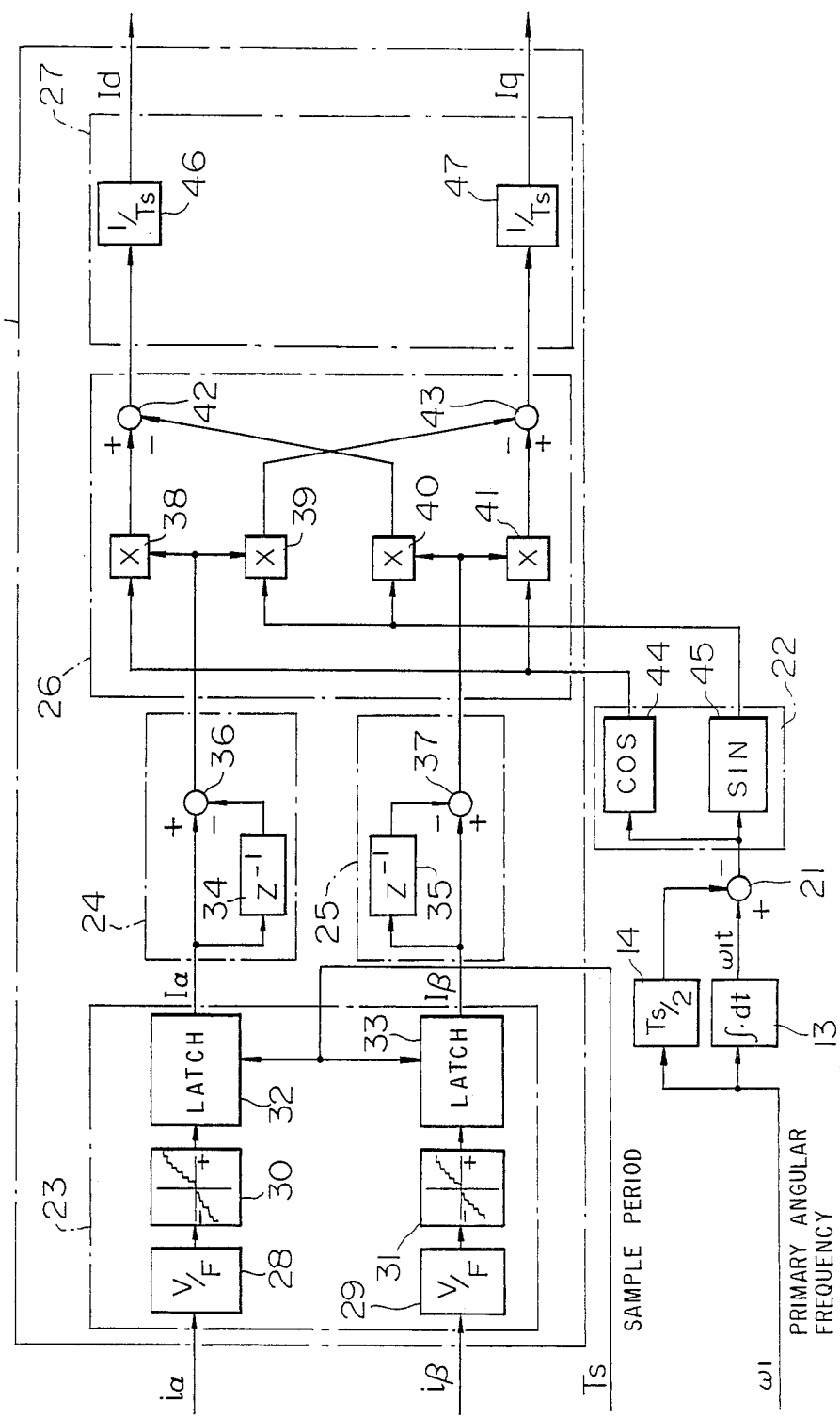
FIG. 5 is a circuit diagram showing the details of a second embodiment of the current component detector according to the invention.

While the embodiment of FIG. 3 shows the construction which ensures the most accurate detection, where the primary angular frequency $\omega_1$ or the period $T_S$ is small enough, the term $1/T_S$ in the right member of the equation (10) becomes sufficiently large as compared with the term $\omega_1^2 \cdot T_S/24$ thus making it possible to approximate the gain correction with the term $1/T_S$ alone, and therefore the construction of another embodiment can be simplified in that the gain compensating circuit 27 is composed of only the proportional gain circuits 46 and 47 and the multipliers 48, 49 and 59, the proportional gain circuits 51 and 52 and the adders 53 and 54 are eliminated. In the case of this simple construction, the proportional gain circuits 46 and 47 are connected in series with the corresponding outputs of the coordinate transformation circuit 26 and the outputs of the proportional gain circuits 46 and 47 respectively become an exciting current component $I_d$ and a torque current component $I_q$. FIG. 5 shows the circuit construction of the embodiment including the gain compensation circuit of the simplified type.

Figure 6:
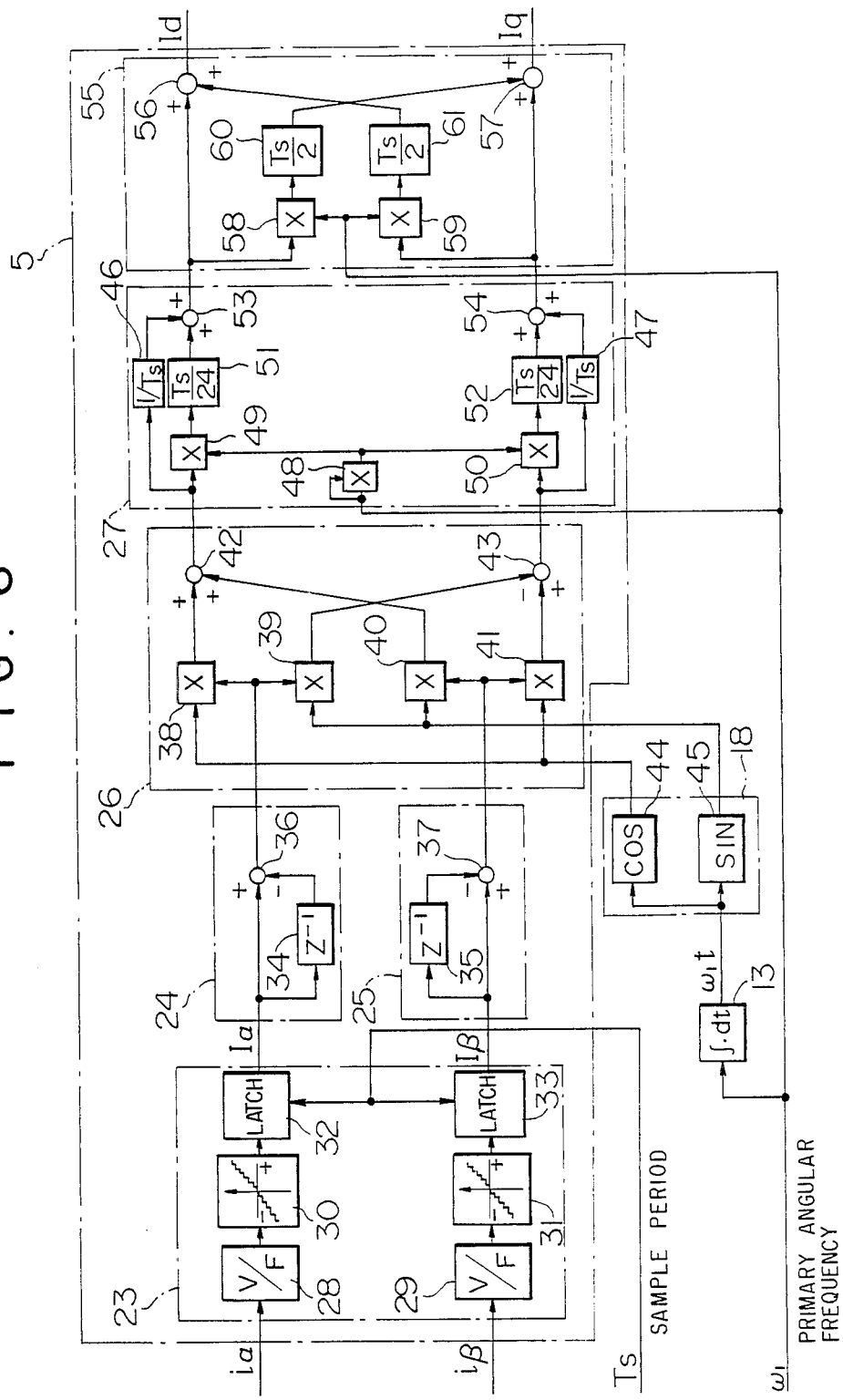
FIG. 6 is a circuit diagram showing the details of a third embodiment of the current component detector according to the invention.

FIG. 6 shows another embodiment of the invention. The same component parts as used in the first embodiment of FIG. 3 are designated by the same reference numerals and their explanation will be omitted. While, in the first embodiment, the coordinate references for the coordinate transformation are corrected to correct the phase error due to the definite integration of the detected currents during the interval of the given period $T_S$ (the sampling period for current detection), in the second embodiment this correction is effected on the basis of the coordinate transformation result. In FIG. 6, the coordinate reference signals for the coordinate transformation circuit 26 are the outputs of the cosine function oscillator 44 and the sine function oscillator 45 which generates a cosine wave and sine wave in response to the output of the integrator 13 for integrating the primary angular frequency $\omega_1$. The phase error is corrected by a phase lag compensating circuit 55. The phase lag compensating circuit 55 receives the two outputs of the gain compensating circuit 27 through adders 56 and 57 and multipliers 58 and 59, respectively, so that they are multiplied by the primary angular frequency $\omega_1$ in the multipliers 58 and 59, respectively, thereby applying the resulting outputs to proportional gain circuits 60 and 61, respectively. The output of the proportional gain circuit 61 is applied to the adder 56 where it is combined with the output of the adder 53 to calculate an exciting current $I_d$ in the rotating magnetic field coordinate system. On the other hand, the output of the proportional gain circuit 60 is applied to the adder 57 where it is combined with the output of the adder 54 to calculate a torque current $I_q$ in the rotating magnetic field coordinate system.

Next, the operation of the third embodiment will be described with reference to the following expressions. Firstly, the equations (10) and (11) explained in connection with the first embodiment can be expanded to the following expression $$\begin{bmatrix} I_d \\ I_q \end{bmatrix} \approx \left( \frac{1}{T_S} + \frac{\omega_1^2 T_S}{24} \right)^{-1} \cdot \tag{17}$$

$$\begin{bmatrix} \cos \omega_1 t & \sin \omega_1 t \\ -\sin \omega_1 t & \cos \omega_1 t \end{bmatrix} \begin{bmatrix} \Delta I_\alpha \\ \Delta I_\beta \end{bmatrix} + \frac{\omega_1 T_S}{2} \begin{bmatrix} -I_q \\ I_d \end{bmatrix}$$

In other words, this shows that the coordinate transformation is effected by using the coordinate references of the rotating magnetic field coordinate system and also the second term in the right member of equation (17) is used as a compensation factor, thereby effecting the detection of the exciting current and the torque current in the rotating magnetic field coordinate system by means of the highly accurate fundamental harmonic component in the same manner as the first embodiment.

With the construction of the system in FIG. 1, the three phase ac currents $i_u$, $i_v$ and $i_w$ are converted to the two phase currents $i_\alpha$ and $i_\beta$ by the 3 phase-2 phase converter 4. In accordance with another embodiment of the invention, it is possible to utilize the relation $i_u + i_v + i_w = 0$ so that only the two phases of the three phases are detected to detect the two phase currents $i_\alpha$ and $i_\beta$. In other words, the expression for the 3 phase-2 phase conversion can be given as follows $$\begin{bmatrix} i_\alpha \\ i_\beta \end{bmatrix} = \begin{bmatrix} \frac{2}{3} & -\frac{1}{3} & -\frac{1}{3} \\ 0 & \frac{1}{\sqrt{3}} & -\frac{1}{\sqrt{3}} \end{bmatrix} \begin{bmatrix} i_u \\ i_v \\ i_w \end{bmatrix} \tag{18}$$

Here $$i_u + i_v + i_w = 0$$

Therefore, $$\begin{bmatrix} i_\alpha \\ i_\beta \end{bmatrix} = \begin{bmatrix} -1 & -1 \\ \frac{1}{\sqrt{3}} & -\frac{1}{\sqrt{3}} \end{bmatrix} \begin{bmatrix} i_v \\ i_w \end{bmatrix} \quad (19)$$

Figure 7A:
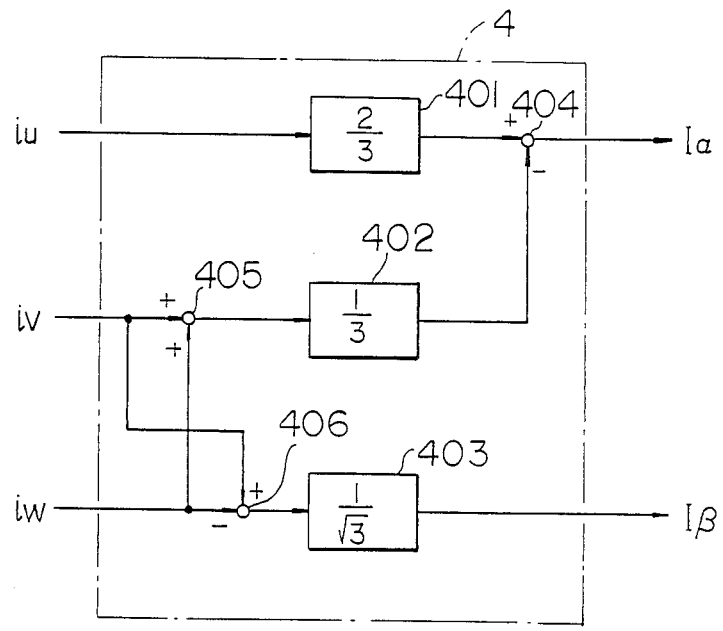
FIGS. 7A and 7B are diagrams showing embodiments of a three phase-two phase converter.
Figure 7B:
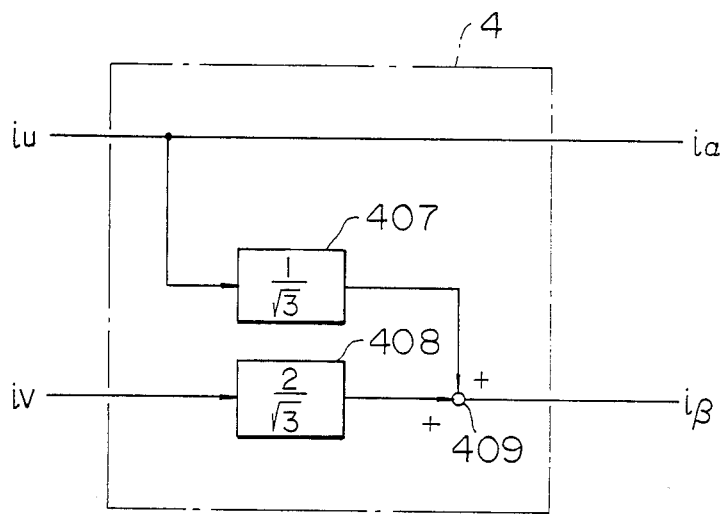

Thus, the two phase currents $i_\alpha$ and $i_\beta$ are determined from the two phase alternating currents $i_v$ and $i_w$ of the three phase alternating currents. FIGS. 7A and 7B show exemplary circuits of the 3 phase-2 phase converter 4 for the 3 phase-2 phase conversion and 2 phase-2 phase conversion, respectively. In the Figures, numerals 401, 402, 403, 407 and 408 designate amplifier circuits each having the proportional gain shown, and 404, 405, 406 and 409 summing circuits.

Here, the following equation is derived from equation (18)

$$\begin{bmatrix} \int i_\alpha \, dt \\ \int i_\beta \, dt \end{bmatrix} = \begin{bmatrix} -1 & -1 \\ \frac{1}{\sqrt{3}} & -\frac{1}{\sqrt{3}} \end{bmatrix} \begin{bmatrix} \int i_v \, dt \\ \int i_w \, dt \end{bmatrix} \quad (20)$$

Figure 8:
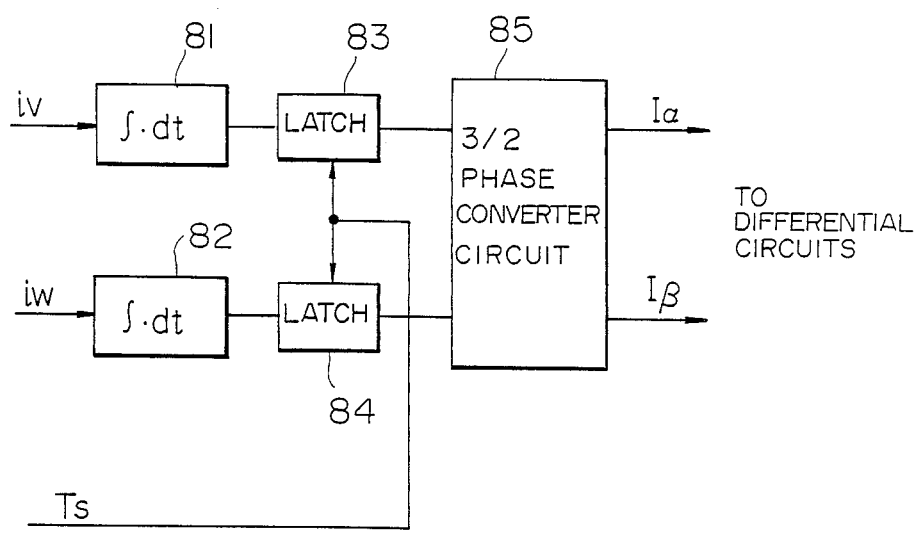
FIG. 8 is a diagram showing the construction of a fourth embodiment of the current component detector according to the invention.

In the embodiments of FIGS. 3, 5 and 6, the integrating operation is effected after the 3 phase-2 phase conversion has been effected. However, it is seen that the two phase currents $i_\alpha$ and $i_\beta$ can also be obtained by directly integrating the two phase currents of the three phase currents from the above equation (20), latching the integrated values at the given period $T_S$ and subjecting the latched values to phase conversion by the converting circuit of FIGS. 7A or 7B. FIG. 8 shows an embodiment for such purposes. According to this embodiment, a phase converting circuit and the following signal processing circuit can all be incorporated in a microprocessor. In FIG. 8, numerals 81 and 82 designate integrating circuits, and 83 and 84 latch circuits. These integrating circuits and latch circuits may be of the same construction as the integrator 23 in the embodiment of FIG. 3. Also, the 3 phase-2 phase converter may be comprised of the one shown in FIGS. 7A or 7B. The outputs $I_\alpha$ and $I_\beta$ can be just applied to the differential circuits 24 and 25 in the embodiment of FIGS. 3, 5 or 6. The following operations are the same as the other embodiments and will not be explained.

Figure 9A:
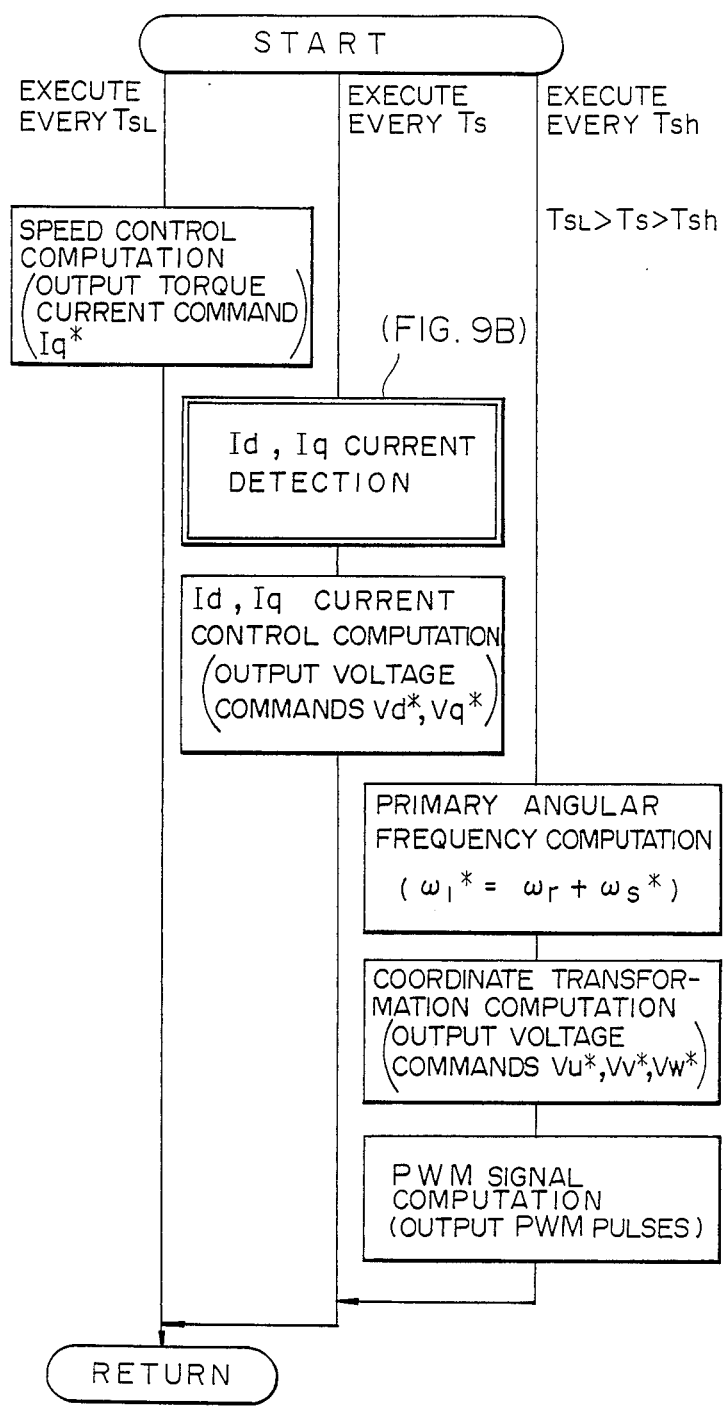
FIGS. 9A and 9B are flow charts showing the operations performed when the invention is realized by using a microprocessor.
Figure 9B:
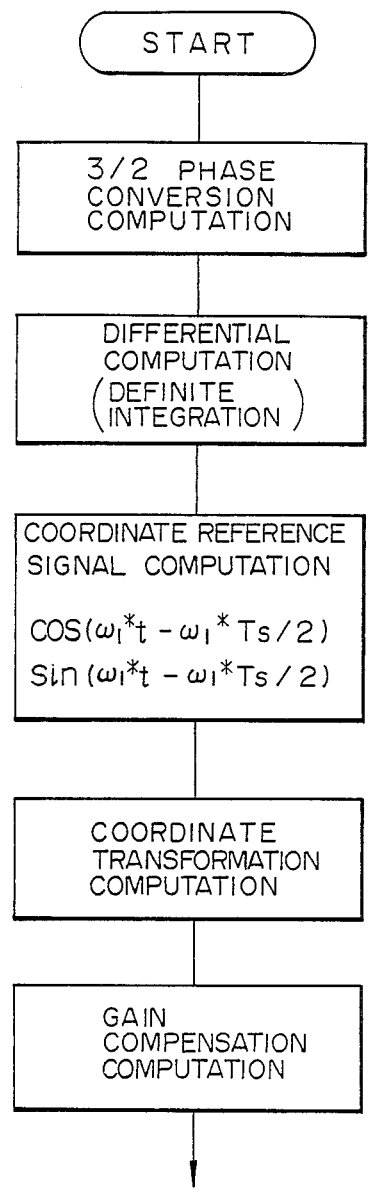

While the above embodiments have been illustrated and explained in the form of blocks such as analog circuits for purposes of facilitating their understanding, the portions enclosed by the dot-and-dash line in FIG. 1 can also be provided by digital circuits (microprocessor). For example, this can be accomplished by a microprocessor having a program of the processing flows shown in FIGS. 9A and 9B.

Also, while the currents of an ac induction motor have been described in detail in the foregoing description, it is of course possible to apply the invention to a system for subjecting the ac voltages and flux to the coordinate transformation to detect the vector (fundamental wave component) in the rotating magnetic field coordinate system and the same effects as the embodiments of the invention can be obtained.

We claim:

1. A vector control method for a three-phase ac induction motor comprising the steps of:

applying an exciting current command value and a torque current command value in a rotating magnetic field coordinate system;

detecting an actual exciting current value and torque current value;

detecting a deviation between said exciting current command value and said detected exciting current value and a deviation between said torque current command value and said detected actual torque current value;

producing three phase ac voltage command values in a stator coordinate system tending to reduce said deviations to zero; and determining voltages and a frequency for driving said induction motor in accordance with said three phase ac voltage command values;

said actual exciting current value and torque current value detecting step further comprising, integrating a value of each of selected two phase ac inputs of three phase ac inputs of said induction motor and then sampling the integrated values at a predetermined period;

subjecting each of said sampled values of the integrated two phase ac inputs to a definite integration at said predetermined period; and transforming said definite integrated values respectively to an actual exciting current value and torque current value in a rotating magnetic field coordinate system.

2. A method according to claim 1, wherein said predetermined period is selected to be the same with or an integral multiple of a period of harmonics contained in said three phase ac inputs.

3. A method according to claim 2, where said integer is preferably selected between 1 and 5.

4. A method according to claim 3, wherein said sampling and definite integration steps comprise converting the magnitude of each of said two phase ac inputs to a number of pulses indicative thereof, counting each said number of pulses for said predetermined period, holding each said count value every said predetermined period, and calculating a difference between a value held at an nth period and a value held at a (n+1)th period, thereby calculating each said definite integrated value.

5. A method according to claim 4, wherein said transforming step transforms each said definite integrated value in said stator coordinate system to a value in said rotating field coordinate system in accordance with coordinate reference signals, and wherein said coordinate reference signals are produced in accordance with a value of a primary angular frequency of said induction motor.

6. A method according to claim 5, wherein said coordinate reference signals are produced on the basis of a signal delayed from said primary angular frequency signal by a phase angular value concerning to a product of said primary angular frequency of said induction motor and said predetermined period.

7. A method according to claim 5 or 6, wherein said transforming step further comprises correcting an amplitude value of each said coordinate transformed value in accordance with a value concerning to a magnitude of said predetermined period.

8. A method according to claim 5 or 6, wherein said transforming step further comprises correcting an amplitude value of each said coordinate transformed value in accordance with values concerning to a magnitude of said predetermined period and the value of said primary angular frequency.

9. A vector control method for a three-phase ac induction motor driven by a pulse width modulation-type power converter comprising the steps of:
applying an exciting current command value and a torque current command value in a rotating magnetic field coordinate system;
detecting an actual exciting current value and torque value;
detecting a deviation between said exciting current command value and said detected actual exciting value and a deviation between said torque current command value and said detected actual torque value;
producing three phase ac voltage command values in a stator coordinate system tending to reduce said deviations to zero and using the same as control signals for said PWM-type power converter; and
causing said power converter to determine voltages for driving said induction motor and a frequency in accordance with said three phase ac voltage command values;
said actual exciting current value and torque current value detecting step further comprising,
integrating a value of each of two phase ac inputs of three phase ac inputs of said induction motor and then sampling the integrated values at a predetermined period;
subjecting each of said sampled values of the integrated two phase ac values to definite integration at said predetermined period; and
transforming said definite integrated values to an actual exciting current value and torque current value in said rotating magnetic field coordinate system.

10. A method according to claim 9, wherein said predetermined period is selected to be integral multiple of a period of a carrier wave of said PWM-type power converter.

11. A method according to claim 10, wherein said sampling and definite integration step comprises converting a magnitude of each of said two phase ac inputs to a number of pulses indicative thereof, counting each said number of pulses for said predetermined period, holding each said count value at said predetermined period, and calculating a difference between a value held at an nth period and a value held at a (n+1)th period, thereby calculating each said definite integrated value.

12. A method according to claim 11, wherein said transforming step transforms each said integrated value in said stator coordinate system to a value in said rotating magnetic field coordinate system in accordance with coordinate reference signals, and wherein said coordinate reference signals are produced in accordance with a value of a primary angular frequency of said induction motor.

13. A method according to claim 12, wherein said coordinate reference signals are produced on the basis of a signal delayed from said primary angular frequency signal by an angular phase value concerning to a product of said primary angular frequency of said induction motor and said predetermined period.

14. A method according to claim 12 or 13, wherein said transforming step further comprises correcting an amplitude value of each said coordinate transformed value in accordance with a value concerning to a magnitude of said predetermined period.

15. A method according to claim 12 or 13, wherein said transforming step further comprising correcting an amplitude value of each said coordinate transformed value in accordance with values concerning to a magnitude of said predetermined period and the value of said primary angular frequency.

16. A vector control method for a three-phase ac induction motor comprising the steps of:
applying an exciting current command value and a torque current command value in a rotating magnetic field coordinate system;
detecting an actual exciting current value and torque current value;
detecting a deviation between said exciting current command value and said detected actual exciting current value and a deviation between said torque current command value and said detected actual torque current value;
producing three phase ac voltage command values in a stator coordinate system tending to reduce said deviations to zero; and
determining voltages and a frequency for driving said induction motor in accordance with said three phase ac voltage command values;
said actual exciting current value and torque current detecting step further comprising,
transforming three phase ac inputs of said induction motor to orthogonal two phase ac currents in said stator coordinate system,
integrating the orthogonal two phase ac currents,
sampling the integrated value of each of said two phase ac currents at a predetermined period,
detecting a difference between an integrated value of an nth sampled value and an integrating value of a (n+1)th sampled value (n represents a positive integer) of each said ac current value, and
transforming said difference values to an actual exciting current value and torque current value, respectively, in said rotating magnetic field coordinate system.

17. A method according to claim 16, wherein said predetermined period is selected to be the same or integral multiple of a period of harmonic components contained in said three phase ac inputs.

18. A method according to claim 17, wherein said integer is preferably selected to be between 1 and 5.

19. A method according to claim 19, wherein said integrating, sampling and detecting of difference steps include converting a magnitude of each of said two phase ac inputs to a number of pulses indicative thereof, counting each said number of pulses for said predetermined period, holding each said count value at said predetermined period, and calculating a difference between a value held at an nth period and a value held at a (n+1)th period, thereby calculating each said difference value.

20. A method according to claim 19, wherein said transforming step transforms each said definite integrated value in said stator coordinate system to a value in said rotating magnetic field coordinate system in accordance with coordinate reference signals, and wherein said coordinate reference signals are produced in accordance with a value of a primary angular frequency of said induction motor.

21. A method according to claim 20, wherein said coordinate reference signals are produced on the basis of a signal delayed from said primary angular frequency signal by an angular phase value concerning to a product of said primary angular frequency of said induction motor and said predetermined period.

22. A method according to claim 20 or 21, wherein said transforming step further comprising correcting an amplitude value of each said coordinate transformed value in accordance with a value concerning to a magnitude of said predetermined period.

23. A method according to claim 20 or 21, wherein said transforming step further comprising correcting an amplitude value of each said coordinate transformed value in accordance with values concerning to a magnitude of said predetermined period and the value of said primary angular frequency.

24. A vector control method for a three-phase ac induction motor comprising the steps of:
applying an exciting current command value and a torque current command value in a rotating magnetic field coordinate system;
detecting an actual exciting current value and torque current value;
detecting a deviation between said exciting current command value and said detected exciting current value and a difference between said torque current command value and said detected actual torque current value;
producing three phase ac voltage command values in a stator coordinate system tending to reduce said deviations to zero; and
determining voltages and a frequency for driving said induction motor in accordance with said three phase ac voltage command values;
said step for detecting said actual exciting current value and torque current value further comprising,
integrating a value of each of two phase ac inputs of three phase ac inputs to said induction motor and then sampling the integrated values at a predetermined period;
transforming said integrated value to orthogonal two phase ac values in said stator coordinate system;
detecting a difference between integrated values of nth and (n+1)th sampled values of each of said transformed orthogonal two phase ac values (n is a positive integer); and
transforming said difference values to an actual exciting current value and torque current value, respectively, in said rotating magnetic field coordinate system.

25. A method according to claim 24, wherein said predetermined period is selected to be the same or integral multiple of a period of harmonic components contained in said three phase ac inputs.

26. A method according to claim 25, wherein said integer is preferably selected to be between 1 and 5.

27. A method according to claim 26, wherein said sampling and integrating step comprises converting a magnitude of each of said two phases ac inputs to a number of pulses indicative thereof, counting each said number of pulses for said predetermined period, and holding each said count value every said predetermined period, and wherein said difference detecting step comprises calculating a difference between a value held at an nth period and a value held at a (n+1)th period for each of said transformed orthogonal two phase ac values.

28. A method according to claim 27, wherein said transforming step transforms each said integrated value in said stator coordinate system to a value in said rotating magnetic field coordinate system in accordance with coordinate reference signals, and wherein said coordinate reference signals are produced in accordance with a value of a primary angular frequency of said induction motor.

29. A method according to claim 28, wherein said coordinate reference signals are produced on the basis of a signal delayed from said primary angular frequency signal by an angular phase value concerning to a product of said primary angular frequency of said induction motor and said predetermined period.

30. A method according to claim 28 or 29, wherein said transforming step further comprises correcting an amplitude value of each said coordinate transformed value in accordance with a value concerning to a magnitude of said predetermined period.

31. A method according to claim 28 or 29, wherein said transforming step further comprises correcting an amplitude value of each said coordinate transformed value in accordance with values concerning to a magnitude of said predetermined period and the value of said primary angular frequency.

32. A vector control system for a three-phase ac induction motor comprising:
a power converter for generating three phase ac currents;
an induction motor for receiving said three phase ac currents;
means for detecting a value of each phase current of said three phase ac currents;
means for receiving an exciting current command value and a torque current command value in a rotating magnetic field coordinate system for said induction motor;
means for detecting an actual exciting current value and torque current value;
means for detecting a deviation between said exciting current command value and said detected exciting current value and a deviation between said torque current command value and said detected torque current value;
means for producing voltage commands in said rotating magnetic field coordinate system tending to reduce said deviations to zero;
first coordinate transformation means for transforming said voltage commands to three phase ac voltage commands in a stator coordinate system;
means responsive to said three phase ac command values to control said power converter;
said actual exciting current value and torque current value detecting means including,
means for integrating a value of each of two phase ac currents of said detected three phase ac currents and sampling said integrated value at a predetermined period;
means for subjecting each of said sampled value of the integrated two phase ac currents to definite integration at said predetermined period; and
second coordinate transformation means for transforming said definite integrated values to an actual exciting current value and torque current value, respectively, in said rotating magnetic field coordinate system.

33. A system according to claim 32, wherein said predetermined period is selected to be the same or integral multiple of a period of harmonic components contained in said three phase ac inputs.

34. A system according to claim 33, wherein said integer is preferably selected to be between 1 and 5.

35. A system according to claim 34, wherein said sampling means and definite integration means comprise voltage-frequency converting means for converting a magnitude of each of said two phase ac values to a number of pulses indicative thereof, means for counting each said number of pulses for said predetermined period, latch means for holding each said count value every said predetermined period, and differential computation means for calculating a difference between a value held at an nth period and a value held at a (n+1)th period to calculate each said definite integrated value.

36. A system according to claim 35, wherein said second coordinate transformation means comprises reference signal generating means for producing coordinate reference signals in accordance with a value of a primary angular frequency of said induction motor, thereby transforming each said definite integrated value in said stator coordinate system to a value in said rotating magnetic field coordinate system in accordance with said coordinate reference signals.

37. A system according to claim 36, wherein said reference signal generating means produces said coordinate reference signals in accordance with a signal delayed from said primary angular frequency signal by an angular phase value concerning to a product of said primary angular frequency of said induction motor and said predetermined period.

38. A system according to claim 36 or 37, wherein said second coordinate transformation means further comprises phase correcting means for correcting an amplitude value of each said coordinate transformed value in accordance with a value concerning to a magnitude of said predetermined period.

39. A system according to claim 36 or 37, wherein said second coordinate transformation means further comprises gain compensating means for correcting an amplitude value of each said coordinate transformed value in accordance with values concerning to a magnitude of said predetermined period and the value of said primary angular frequency.

40. A vector control system for a three phase ac induction motor comprising:
a pulse width modulation-type power converter for generating three phase ac currents;
an induction motor for receiving said three phase ac currents;
means for detecting a value of each of said three phase ac currents;
means for receiving an exciting current command value and a torque current command value in a rotating magnetic field coordinate system for said induction motor;
means for detecting an actual exciting current value and torque current value;
means for detecting a deviation between said exciting current command value and said detected exciting current value and a deviation between said torque current command value and said detected torque current value;
means for producing voltage commands in said rotating magnetic field coordinate system tending to reduce said deviations to zero;
first coordinate transformation means for transforming said voltage commands to three phase ac voltage commands in said stator coordinate system; and
means responsive to said three phase ac voltage command values to control said power converter;
said actual exciting current value and torque current value detecting means including,
means for integrating a value of each of two phase ac currents of said detected phase currents and sampling the integrated value at a predetermined period;
means for subjecting each of said sampled value of the integrated two phase ac currents to definite integration at said predetermined period;
second coordinate transformation means for transforming said definite integrated values to an actual exciting current value and torque current value, respectively, in said rotating magnetic field coordinate system.

41. A system according to claim 40, wherein said predetermined period is selected to be integral multiple of a period of a carrier wave of said pulse width modulation-type power converter.

42. A system according to claim 42, wherein said sampling means and definite integration means comprise voltage-frequency converting means for converting a value of each of said two phase ac currents to a number of pulses proportional to the magnitude thereof, counting means for counting each said number of pulses for said predetermined period, latch means for holding each said count value every said predetermined period, and differential computation means for calculating a difference between a value held at an nth period and a value held at a (n+1)th period thereby calculating each said definite integrated value.

43. A system according to claim 42, wherein said second coordinate transformation means comprises reference signal generating means for producing coordinate reference signals in accordance with a value of a primary angular frequency of said induction motor whereby each said definite integrated value in said stator coordinate system is transformed to a value in said rotating magnetic field coordinate system in accordance with said coordinate reference signals.

44. A system according to claim 43, wherein said reference signal generating means produces said coordinate reference signals on the basis of a signal delayed from said primary angular frequency signal by an angular phase value concerning to a product of said primary angular frequency of said induction motor and said predetermined period.

45. A system according to claim 43 or 44, wherein said second coordinate transformation means further comprises phase correcting means for correcting an amplitude value of each said coordinate transformed value in accordance with a value concerning to a magnitude of said predetermined period.

46. A system according to claim 43 or 44, wherein said second coordinate transformation means further comprises gain compensating means for correcting an amplitude value of each said coordinate transformed value in accordance with values concerning to a magnitude of said predetermined period and the value of said primary angular frequency.

47. A vector control system for a three-phase ac induction motor comprising:
a power converter for generating three phase ac currents;

an induction motor for receiving said three phase ac currents;

means for detecting a value of each of said three phase ac currents;

means for receiving an exciting current command value and a torque current command value in a rotating magnetic field coordinate system for said induction motor;

means for detecting an actual exciting current value and torque current value;

means for detecting a deviation between said exciting current command value and said detected exciting current and a deviation between said torque current command value and said detected torque current value;

means for producing voltage commands in said rotating magnetic field coordinate system tending to reduce said deviations to reduce;

first coordinate transformation means for transforming said three phase voltage commands to three phase ac voltage commands in a stator coordinate system; and means responsive to said three phase ac voltage command values to control said power converter;

said actual exciting current value and torque current value detecting means comprising, 3 phase-2 phase converting means for converting said detected three phase currents to orthogonal two phase ac currents in said stator coordinate system;

means for integrating a value of each of said orthogonal two phase ac currents and sampling the integrated value at a predetermined period;

means for detecting a difference between an integrated value of an nth sampled value and an integrated value of a (n+1)th sampled value (n is a positive integer); and second coordinate transformation means for transforming said differential values to an actual exciting current value and torque current value, respectively, in said rotating magnetic field coordinate system.

48. A system according to claim 47, wherein said predetermined period is selected to be the same or integral multiple of a period of harmonic components contained in said three phase ac currents.

49. A system according to claim 48, wherein said integer is preferably selected to be between 1 and 5.

50. A system according to claim 49, wherein said sampling means and integrating means comprise voltage frequency converting means for converting a value of each of said two phase ac currents to a number of pulses proportional to the magnitude thereof, counter means for counting each said number of pulses for said predetermined period, and latch means for holding each said count value every said predetermined period, and said differential detecting means comprises differential computation means for calculating a difference between a value held at an nth period and a value held at a (n+1)th period thereby calculating each said differential value.

51. A system according to claim 50, wherein said second coordinate transformation means comprises reference signal generating means for producing coordinate reference signals in accordance with a value of a primary angular frequency of said induction motor whereby each said definite integrated value in said stator coordinate system is transformed to a value in said rotating magnetic field coordinate system in accordance with said coordinate reference signals.

52. A system according to claim 51, wherein said reference signal generating means produces said coordinate reference signals on the basis of a signal delayed from said primary angular frequency signal by an angular phase value concerning to a product of said primary angular frequency of said induction motor and said predetermined period.

53. A system according to claim 51 or 52, wherein said second coordinate transformation means further comprises phase correcting means for correcting an amplitude value of each said coordinate transformed value in accordance with a value concerning to a magnitude of said predetermined period.

54. A system according to claim 51 or 52, wherein said second coordinate transformation means further comprises gain compensating means for correcting an amplitude of each said coordinate transformed value in accordance with values concerning to a magnitude of said predetermined period and the value of said primary angular frequency.

55. A vector control system for a three-phase ac induction motor comprising:

a power converter for generating three phase ac currents;

an induction motor for receiving said three phase ac currents;

means for detecting a value of each of said three phase ac currents;

means for receiving an exciting current command value and a torque current command value in a rotating magnetic field coordinate system for said induction motor;

means for detecting an actual exciting current value and torque current value;

means for detecting a deviation between said exciting current command value and said detected exciting current value and a deviation between said torque current command value and said detected torque current value;

means for producing voltage commands in said rotating magnetic field coordinate system tending to reduce said deviations to zero;

first coordinate transformation means for transforming said voltage commands to three phase ac voltage commands in said stator coordinate system; and means responsive to said three phase ac voltage command values to control said power converter;

said actual exciting current value and torque current value detecting means including;

means for integrating a value of each of two phase ac currents of said detected three phase ac currents and sampling the integrated value at a predetermined period;

phase converting means for converting said integrated values to orthogonal two phase ac values in said stator coordinate system;

means for detecting a difference between an integrated value of an nth sampled value and an integrated value of a (n+1)th sampled value of each of said converted orthogonal two phase ac values (n is a positive integer); and second coordinate transformation means for transforming said differential values to an actual exciting current value and torque current value, respectively, in said rotating magnetic field coordinate system.

56. A system according to claim 55, wherein said predetermined period is selected to be the same or integral multiple of a period of harmonic components contained in said three phase ac currents.

57. A system according to claim 56, wherein said integer is preferably selected to be between 1 and 5.

58. A system according to claim 57, wherein said sampling means and integrating means comprise voltage-frequency converting means for converting a value of each of said two phase ac currents to a number of pulses porportional to the magnitude thereof, counter means for counting each said number of pulses for said predetermined period, and latch means for holding each said count value every said predetermined period, and wherein said differential detecting means comprises differential computation means for calculating a difference between a value held at an nth period and a value held at a (n+1)th period thereby calculating each said differential value.

59. A system according to claim 58, wherein said second coordinate transformation means comprises reference signal generating means for producing coordinate reference signals in accordance with a value of a primary angular frequency of said induction motor whereby each said definite integrated value in said stator coordinate system is transformed to a value in said rotating magnetic field coordinate system in accordance with said coordinate reference signals.

60. A system according to claim 59, wherein said reference signal generating means produces said coordinate reference signals on the basis of a signal delayed from said primary angular frequency signal by an angular phase value concerning to a product of said primary angular frequency of said induction motor and said predetermined period.

61. A system according to claim 59 or 60, wherein said second coordinate transformation means further comprises phase correcting means for correcting an amplitude value of each said coordinate transformed value in accordance with a value concerning to a magnitude of said predetermined period.

62. A system according to claim 59 or 60, wherein said second coordinate transformation means further comprises gain compensating means for correcting an amplitude value of each said coordinate transformed value in accordance with values concerning to a magnitude of said predetermined period and the value of said primary angular frequency.

* * * * *